(12) United States Patent
Takamizawa et al.

(10) Patent No.: US 7,271,924 B1
(45) Date of Patent: Sep. 18, 2007

(54) PRINTER, CONTROL METHOD FOR THE SAME, AND CONTROL DEVICE

(75) Inventors: Yuji Takamizawa, Shimosuwa-machi (JP); Atsushi Yamaji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 779 days.

(21) Appl. No.: 09/690,694

(22) Filed: Oct. 16, 2000

(30) Foreign Application Priority Data

Oct. 15, 1999 (JP) ............................. 11-294402
Aug. 28, 2000 (JP) ............................. 2000-257889

(51) Int. Cl.
*G06F 15/00* (2006.01)
*G06F 3/12* (2006.01)

(52) U.S. Cl. .................... 358/1.14; 358/1.1; 358/1.15

(58) Field of Classification Search .............. 358/1.15, 358/1.12, 1.16, 434, 442, 444, 1.13, 1.14, 358/1.1; 400/61, 76, 74; 709/237; 714/56; 711/100, 144; 700/213, 79.9

See application file for complete search history.

(56) References Cited

U.S. PATENT DOCUMENTS

| | | | | |
|---|---|---|---|---|
| 4,319,323 A | * | 3/1982 | Ermolovich et al. | 711/100 |
| 4,527,236 A | * | 7/1985 | Ermolovich | 714/56 |
| 4,825,405 A | * | 4/1989 | Makino et al. | 400/61 |
| 5,014,221 A | * | 5/1991 | Mogul | 358/1.14 |
| 5,046,027 A | * | 9/1991 | Taaffe et al. | 345/557 |
| 5,054,096 A | * | 10/1991 | Beizer | 382/305 |
| 5,079,765 A | * | 1/1992 | Nakamura | 370/401 |
| 5,123,089 A | * | 6/1992 | Beilinski et al. | 709/237 |
| 5,151,895 A | * | 9/1992 | Vacon et al. | 370/420 |
| 5,179,651 A | * | 1/1993 | Taaffe et al. | 345/555 |
| 5,191,525 A | * | 3/1993 | LeBrun et al. | 715/500 |
| 5,196,943 A | * | 3/1993 | Hersee et al. | 358/403 |
| 5,220,674 A | * | 6/1993 | Morgan et al. | 709/223 |
| 5,546,514 A | * | 8/1996 | Nishiyama | 358/1.12 |
| 5,594,653 A | * | 1/1997 | Akiyama et al. | 358/1.15 |
| 5,598,271 A | * | 1/1997 | Ohtani | 358/296 |
| 5,666,215 A | * | 9/1997 | Fredlund et al. | 358/487 |
| 5,679,940 A | * | 10/1997 | Templeton et al. | 235/380 |
| 5,706,410 A | * | 1/1998 | Bagley et al. | 358/1.13 |
| 5,800,081 A | * | 9/1998 | Teradaira et al. | 400/74 |
| 5,881,168 A | * | 3/1999 | Takaoka et al. | 382/180 |
| 5,885,010 A | * | 3/1999 | Kim | 400/54 |
| 5,978,560 A | * | 11/1999 | Tan et al. | 358/1.15 |
| 6,006,231 A | * | 12/1999 | Popa | 707/101 |
| 6,031,976 A | * | 2/2000 | Koakutsu et al. | 358/1.16 |
| 6,075,925 A | * | 6/2000 | Downing et al. | 358/1.1 |
| 6,082,910 A | * | 7/2000 | Teradaira et al. | 400/74 |
| 6,122,073 A | * | 9/2000 | Miyasaka et al. | 358/434 |
| 6,132,117 A | * | 10/2000 | Fukano et al. | 400/76 |
| 6,147,765 A | * | 11/2000 | Yoneda | 358/1.15 |

(Continued)

FOREIGN PATENT DOCUMENTS

EP 0 945 824 A2 9/1999

*Primary Examiner*—Madeleine A V Nguyen (57) ABSTRACT

When the printer is off-line and receives a large volume of data, the receive buffer is not filled and the communication interface with the host computer does not enter a busy state. A receive buffer temporarily stores data, including control commands, from the host computer, and the printer operates according to the sequentially interpreted content of data stored to the receive buffer. By detecting whether the printer is on-line or off-line, data in the receive buffer is cleared when the printer goes off-line and data received from the host while the printer is off-line is destroyed without being buffered.

18 Claims, 6 Drawing Sheets

U.S. PATENT DOCUMENTS

| | | | |
|---|---|---|---|
| 6,198,985 B1* | 3/2001 | Miyasaka et al. | 700/213 |
| 6,205,363 B1* | 3/2001 | Miyasaka et al. | 700/9 |
| 6,208,906 B1* | 3/2001 | Miyasaka et al. | 700/79 |
| 6,219,151 B1* | 4/2001 | Manglapus et al. | 358/1.15 |
| 6,281,989 B1* | 8/2001 | Tomida | 358/442 |
| 6,360,135 B1* | 3/2002 | Miyasaka et al. | 700/213 |
| 6,362,896 B1* | 3/2002 | Miyasaka et al. | 358/1.16 |
| 6,388,760 B2* | 5/2002 | Kadota et al. | 358/1.14 |
| 6,408,008 B1* | 6/2002 | Komarek et al. | 370/458 |
| 6,411,404 B1* | 6/2002 | Matsuo et al. | 358/444 |
| 6,421,764 B2* | 7/2002 | Morein | 711/144 |
| 6,457,884 B1* | 10/2002 | Teradaira et al. | 400/74 |
| 6,491,453 B1* | 12/2002 | Fukano et al. | 400/76 |
| 6,519,057 B1* | 2/2003 | Kurosawa et al. | 358/468 |
| 6,570,667 B1* | 5/2003 | Hattori et al. | 358/1.15 |
| 6,583,886 B1* | 6/2003 | Ochiai | 358/1.15 |
| 6,625,676 B1* | 9/2003 | Gold et al. | 710/74 |
| 6,631,009 B1* | 10/2003 | Thomas et al. | 358/1.15 |
| 6,768,557 B1* | 7/2004 | Minowa et al. | 358/1.15 |
| 6,804,028 B1* | 10/2004 | Fukuta | 358/2.1 |
| 2001/0004241 A1* | 6/2001 | Fukano et al. | 340/692 |
| 2003/0128388 A1* | 7/2003 | Mori et al. | 358/1.15 |

* cited by examiner

PRINTER, CONTROL METHOD FOR THE SAME, AND CONTROL DEVICE

BACKGROUND OF THE INVENTION

1. Field of the Invention

The present invention relates to a printer that operates in response to data and control commands received from a host computer, and relates to a control method for such printer. More particularly, our invention relates to such a printer and a method for controlling the printer when the printer is off-line.

2. Description of the Related Art

Printers connected to a host computer receive data, including control commands, from the host and operate to print as instructed by the received control commands. Received data is temporarily stored in a first-in, first-out (FIFO) receive buffer, and sequentially interpreted therefrom by the analyzer section of the CPU. The printer then performs a printing process according to interpreted control command content.

Real-time commands can be contained in the received data. Real-time commands are control commands that are run immediately upon receipt by the printer without being stored to the receive buffer. When a real-time command is received, the printer inserts the real-time command at the front of the command queue for immediate execution before other stored commands. Real-time commands include, for example, a command to return information about the printer status to the host, and commands for recovering the printer from recoverable errors. These commands can be performed by the printer even when an error has occurred and the printer is off-line.

Printers of this type are normally either off-line or on-line. When on-line, data received from the host computer is stored to the receive buffer and sequentially interpreted therefrom by the CPU.

When off-line, data in the receive buffer is not interpreted. Conventionally, when the printer is off-line data can still be received from the host computer and sequentially stored to the receive buffer. The CPU, however, interprets only real-time commands and does not interpret data in the receive buffer when off-line.

This means that the receive buffer can become full (meaning that there is either very little or no space left to store more data) when a large volume of data, such as from a bit image, is received from the host when the printer is off-line. The communication interface of the printer then enters a busy state, indicating that no more data can be received from the host, and thus prevents any additional data, including real-time commands, from being sent from the host to the printer. The host is then unable to detect the printer status or recover the printer from recoverable errors.

Figure 5:
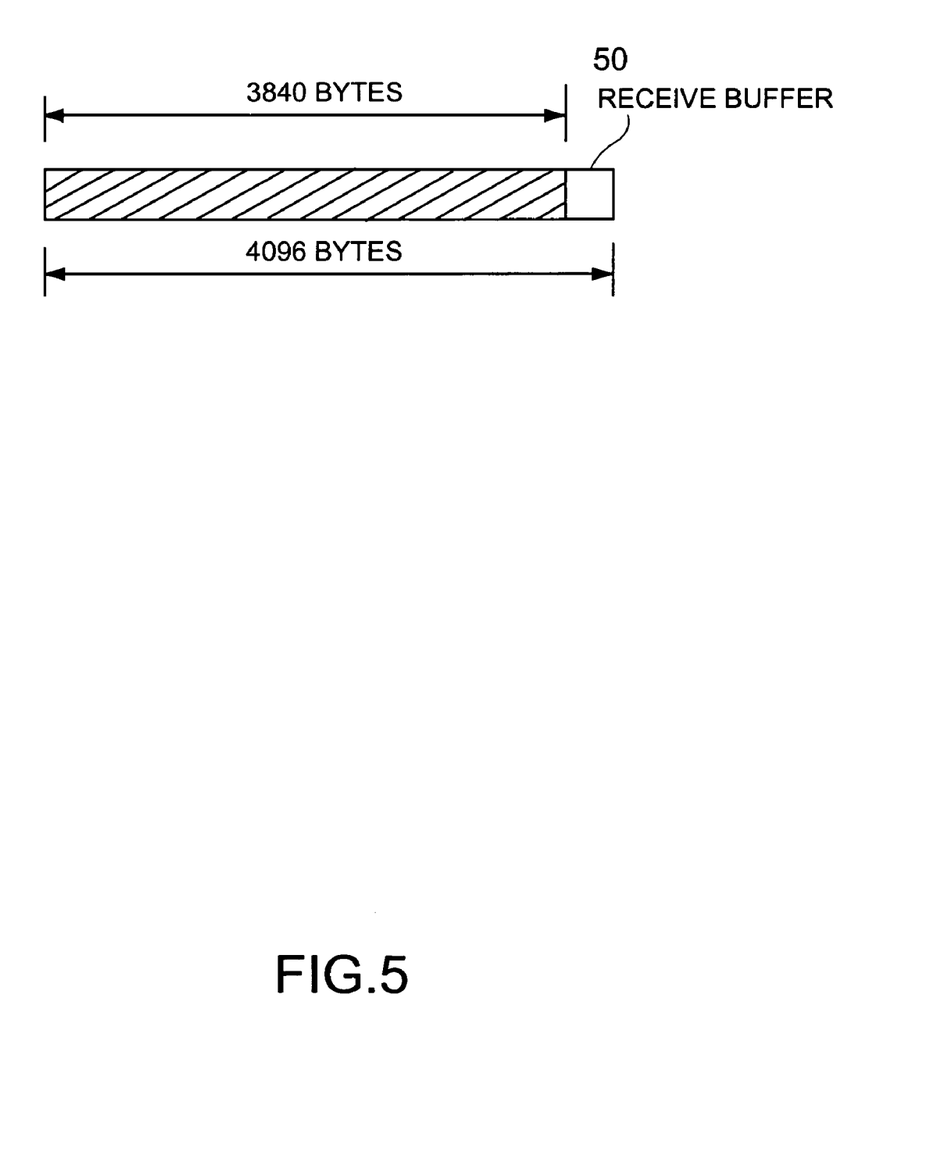
FIG. 5 is a schematic diagram of the receive buffer describing a receive buffer full state.

Referring to FIG. 5, for example, the receive buffer 50 of the printer obviously has a finite capacity, which in this example is shown to be 4096 bytes. The printer indicates a busy state to the host computer whenever a certain specific amount of data is stored to the receive buffer 50. In this example a busy state is indicated when the receive buffer is filled to at least 95% of its capacity (i.e., when 3840 bytes have been stored in this example). If the printer has a print head that prints 640 dots per horizontal line (80 bytes per line), the receive buffer will become full when data sufficient to print 48 dot lines (about 6 mm vertically across the page) has been received (3840/80=48 dot lines).

Figure 6:
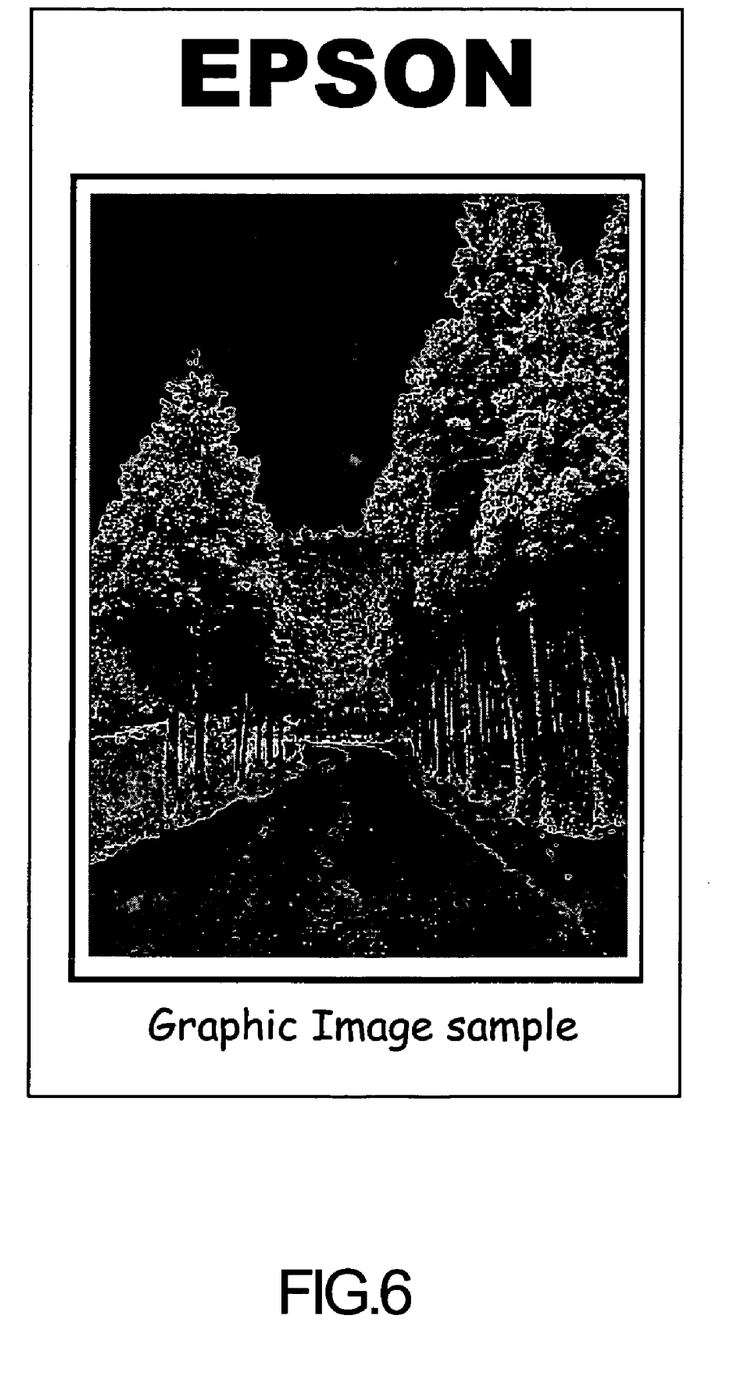
FIG. 6 is an typical example of a bit map image sent to a printer for printing receipts.

This means that if bit map print data such as shown in FIG. 6 equivalent to about one typical receipt is received while the printer is off-line, the receive buffer will be filled almost immediately.

If the host computer sends data to the printer via a print spooler and the printer keeps sending a busy signal, the print spooler will eventually generate an error. However, the application that has sent the data to the spooler cannot delete data from the spooler, and the user must therefore directly delete the unprinted data from the spooler.

OBJECTS OF THE INVENTION

Having identified these problems of a conventional printer, our invention provides a printer control method and a printer in which the receive buffer does not become full even when a large volume of data is received while the printer is off-line, and which therefore prevents the communication interface with the host computer from entering a busy state.

A further object of our invention is to provide a printer control method and printer that can select a mode for storing or a mode for destroying received data when the printer is off-line.

A yet further object of our invention is to provide a printer control method and printer that interprets real-time commands and performs a process according to the content of the real-time command when the printer is in a mode for avoiding a busy state.

A yet further object of our invention is to provide a printer that can delete received data rather than the application program on the host computer deleting transferred data, and thus does not increase the load on the application program.

A yet further object of our invention is to assure that print data sent by the host computer can be reliably printed even if the printer is set to the mode for destroying received data.

SUMMARY OF THE INVENTION

To achieve these objects, a control method according to our invention is for a printer having a receive buffer for temporarily storing data including a control command from a host computer, and operating according to the interpreted content of data in the receive buffer. The control method has a step for detecting whether the printer is in an off-line state in which received data is not interpreted, or in an on-line state in which received data is interpreted; and a clearing unit for implementing a step for clearing data in the receive buffer when the printer is detected to be in the off-line state.

The potential for the receive buffer to become full when the printer is off-line is thus reduced, and the interface with the host computer can be prevented from entering a busy state in most circumstances.

The receive buffer data clearing step in this case is preferably accomplished immediately after the printer goes off-line.

Yet further preferably, the control method additionally has a step for setting the method for handling data when the printer is off-line; and a step for reading this data handling method setting when the printer is detected to be off-line. In this case the receive buffer data clearing step can be controlled to run only when the read data handling method is set to allow clearing data in the receive buffer.

The printer user in this case can select whether to clear or save data received when the printer is off-line, and printer operation can thus be set according to how the printer is being used.

Yet further preferably, the step for setting the off-line data handling method is accomplished according to a specific control command from the host computer. In this case the control bit, or word, setting is stored into memory within the printer according to the control command from the host. Other methods can, of course, be used to set and save the data handling method setting, including DIP switches on the printer itself, or writing the data handling method to fuse ROM or flash memory.

Yet further preferably, the control method has a step for destroying data received from the host computer until the printer goes on-line after the step for clearing data in the receive buffer.

In this case there is no chance for the receive buffer to become full when the printer is off-line.

Further preferably, the step for destroying data received from the host computer is accomplished only when the off-line data handling method is set to allow destruction of data received from the host computer.

The control method can obviously also have in place of the step for destroying data a step for saving in the receive buffer data received from the host computer until the printer goes on-line after clearing data in the receive buffer.

Yet further preferably, this control method additionally has a step for detecting whether the printer is on-line or off-line after the printer is detected to be off-line; and a step for clearing data in the receive buffer when the printer is thus detected to be on-line.

Yet further preferably, the printer also has a print buffer for storing expanded print data, and the steps for clearing data in the receive buffers clearing data in the receive buffer and clearing data in the print buffer.

Yet further preferably, the printer also has a step for determining whether data received by the printer when off-line is a control command to be executed immediately, that is, a real-time command; a step for interpreting the control command and operating the printer according to the interpreted content when the received data is determined to be a real-time command; and a step for destroying said control command.

Control by means of real-time commands is thus enabled even when the printer is off-line, and the printer status can be polled and recoverable printer errors can be corrected using real-time commands.

Our invention also relates to a control method for a host computer for sending data including control commands to a printer operating according to any of the above noted control methods of our invention. This host computer control method has a step for sending print data to the printer in conjunction with a command requesting notification of printing completion; a step for awaiting notification of printing completion from the printer in response to said request command; and a resending unit for implementing a step for resending print data to the printer after receiving an on-line notification from the printer when an off-line notification is received from the printer while awaiting printing completion notification. The resending unit may include a CPU with a program set stored in the ROM.

Data sent from the host computer when the printer is off-line is destroyed in a printer controlled by a method of our invention, but by using this host computer control method the host computer can detect the printer process, that is, whether printing previously sent print data was completed, and can resend the print data if it has been destroyed.

The present invention also relates to a printer having a receive buffer for temporarily storing data including a control command from a host computer, and operating according to the interpreted content of data in the receive buffer. This printer has a line state detection means for detecting whether the printer is in an off-line state in which received data is not interpreted, or an on-line state in which received data is interpreted; and a data clearing unit, or means, for clearing data in the receive buffer when the printer is detected to be in the off-line state by the line state detection means.

This printer further preferably has a means for setting a method for handling data when the printer is off-line; and a data handling method reading means for reading this data handling method setting when the printer is detected to be off-line by the line state detection means. In this case the data clearing means clears the receive buffer only when the data handling method read by the reading means is set to allow clearing data in the receive buffer.

Yet further preferably, the means for setting the off-line data handling method sets the method according to a specific control command from the host computer.

Yet further preferably, the printer has a data destroying means for destroying data received from the host computer while the printer is off-line.

In this case the data destroying means destroys data received from the host computer only when the data handling method read by the data handling method reading means is set to allow destruction of data received from the host computer.

The data clearing means can be further controlled to clear data in the receive buffer even when the line state detecting means detects an on-line state after detecting an off-line state.

Yet further preferably, the printer additionally comprises a print buffer for storing expanded print data. In this case the data clearing means clears data in the receive buffer and clears data in the print buffer.

Yet further preferably, the printer also has a command interpreting means for determining whether data received by the printer when in an off-line state is a control command to be executing immediately, that is, is a real-time command; a printer operating means for interpreting the control command and operating the printer according to the interpreted content when the received data is thus determined to be a real-time command; and a command destroying means for deleting said control command.

Our invention also provides a printer having an interface for receiving data from a host computer; a receive buffer for temporarily storing data received by the interface; a storage means for storing an indicator of whether the printer is in a data clearing mode or a data saving mode when in an off-line state in which received data in the receive buffer is not interpreted; and a data clearing means for clearing data in the receive buffer when in the off-line state and the data clearing mode setting is stored by the storage means.

Further preferably in this case, the storage means sets the data clearing mode and data saving mode setting according to a command received from the host computer.

In this case the receive buffer is cleared even when the printer is off-line if the printer is set to the data clearing mode. The receive buffer therefore has no chance to become full, and real-time commands from the host computer can be easily received and processed.

Yet further preferably, the printer has a command execution means for running an executable command whether in the off-line state or on-line state, regardless of the mode stored by the storage means, when a command that is executable in an off-line state is received by the interface from the host computer.

Yet further preferably, the printer has a control means for controlling buffering data received from the host computer so that new received data is not stored to the receive buffer when the printer is off-line and the data clearing mode is set in the storage means. Alternatively in the clearing mode, data can be destroyed by continuing to store and process received data while the printing motor is not driven such that no printing results from interpreting, i.e. processing, the received data.

Thus comprised, data received from the host computer is destroyed, the receive buffer does not become full, and the printer can therefore receive and run real-time commands from the host computer.

Because the printer can receive real-time commands from the host computer, the cash drawer of a POS station can be opened even when the printer is off-line, for example. In addition, when the user rectifies an error due, for example, to a paper jam or paper cutter jam, causing the printer to go off-line, a real-time command for recovering from the error can be received from the host computer, and the printer can be brought back on-line. Furthermore, the printer can run various real-time status request commands sent by the host, and can thus return the printer status causing the error or off-line state and keep the host informed of the current printer status even while the printer is off-line.

Our invention yet further relates to a host computer for sending data and control commands to a printer as described above. This host computer has a data transmission means for sending print data accompanied by a command requesting printing completion notification to the printer; a notification detection means for awaiting and detecting a printing completion notification from the printer in response to the requesting command; a line state detection means for awaiting and detecting an on-line state or off-line state notification from the printer; and a print data resending means for resending print data to the printer after receiving an on-line notification from the printer when the line state detection means receives an off-line notification from the printer while awaiting printing completion notification.

Our invention provides a control method for a printer having a receive buffer for temporarily storing data including a control command from a host computer, and operating according to the interpreted content of data in the receive buffer. This control method has a step for detecting whether the printer is in an off-line state in which received data is not interpreted, or an on-line state in which received data is interpreted; and a step for destroying without storing to the receive buffer data received from the host computer when the printer is detected to be off-line.

This printer control method is also characterized by running only real-time commands in the data received from the host computer.

With this method the receive buffer will not become full when the printer is off-line, and a busy signal will therefore not be sent from the printer to the host computer.

The printer can therefore reliably receive and run real-time commands sent from the host computer.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
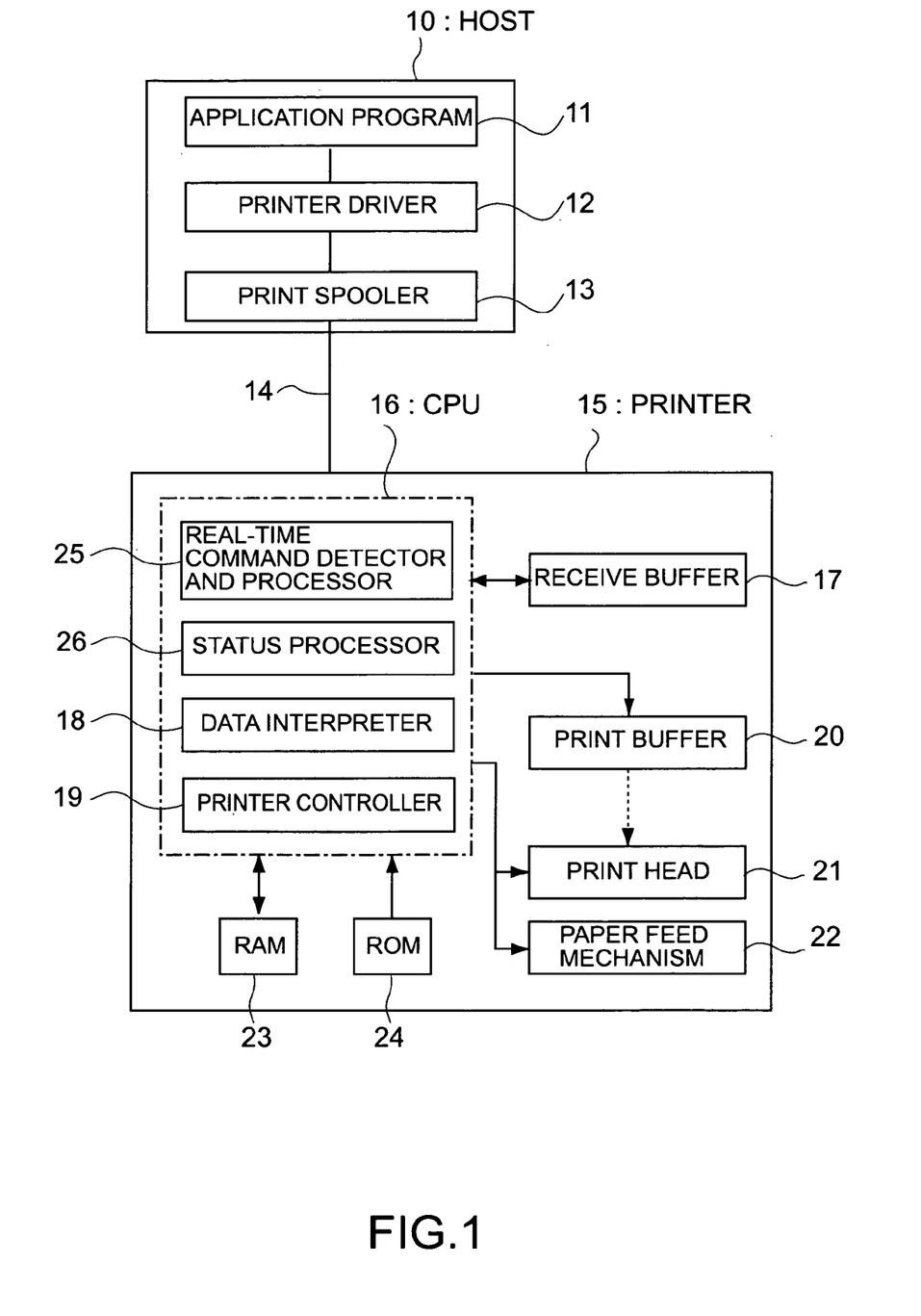
FIG. 1 is a schematic block diagram showing the general connections between a host computer and a printer according to a preferred embodiment of our invention.

The preferred embodiments of our invention are described next below with reference to the accompanying figures, of which FIG. 1 is a schematic diagram showing the general connections between a host computer and a printer of our invention.

As shown in FIG. 1, printer 15 is connected to a host computer 10 (referred to as simply the host below) by way of a Centronics® or other interface cable 14. Printer 15 receives control commands and other data from host 10, and operates accordingly. Host 10 typically begins sending data to the printer when the user selects a print command within an application program 11 running on host 10. Print commands from the application program 11 are passed through printer driver 12 to print spooler 13. Print spooler 13 temporarily stores plural print requests in local memory, and sequentially sends them to printer 15.

Except for real-time commands, which are further described below, printer 15 temporarily stores the sequentially sent and received data to receive buffer 17, which is a FIFO buffer. Data stored into receive buffer 17 is read in sequence from the first stored data, and any control commands are interpreted by data interpreter 18, which runs in CPU 16. Printer controller 19 controls driving the mechanical parts of the printer according to the interpreted control commands, and thus accomplishes printing and other mechanical operations. If the data interpreted by data interpreter 18 is a print command, CPU 16 expands the print data from receive buffer 17 into print buffer 20, and drives print head 21 and paper feed mechanism 22 appropriately to print and output the print data from print buffer 20.

The operation of printer 15 according to our invention can be set by a control command from host 10. That is, printer 15 has an area in RAM 23 reserved for storing these settings, and the specific values stored to this memory area can be set or changed as needed. The settings stored to RAM 23 are read as required and interpreted by CPU 16, which then performs the corresponding process.

These operation settings can also be stored into an EEPROM (electrically erasable programmable ROM), flash memory or other nonvolatile memory device (not shown in the figures) so that the stored content (settings) are not erased when power to printer 15 is turned off.

Printer 15 has an area reserved in RAM 23 for setting the mode that determines how to handle data received when the printer is off-line. This setting determines whether data already stored in receive buffer 17, data received while the printer is off-line, and data in print buffer 20 is held in memory or is destroyed when printer 15 is off-line. This setting is by default set to hold the data, but by sending an appropriate command, the host 10 can change the setting so that data is destroyed.

Printer 15 has a real-time command detector and processor 25 implemented in CPU 16 in conjunction with the control method of our invention. Real-time command detector and processor 25 detects whether received data is a real-time command before storing the received data into receive buffer 17. If the received data is detected to be real-time command, it immediately runs the process indicated by the real-time command before continuing or running any other process. As further described below, real-time commands are interpreted and run even when the off-line data processing mode is set to destroy data. It should be noted that font data, the various settings data, and a control program run by CPU 16 are stored to ROM 24. It will be obvious that ROM 24 can be plural physically discrete memory elements, or various kinds of rewritable nonvolatile memory such as an EEPROM device.

Printer 15 further has a status processor 26, also implemented by CPU 16. This status processor 26 provides an automatic status back (ASB) function for automatically informing host 10 about the printer 15 status independently of any request from host 10. To enable this ASB function, the host 10 first defines the printer status information that the ASB function is to monitor and report. When there is a change in any of this information, the printer 15 automatically notifies the host 10. By thus automatically receiving specific printer status data, host 10 can send print data and control printer 15 operation based on the ASB data without needing to request status information from the printer 15.

Host 10 relies on ASB reports from the printer 15 and real-time commands to monitor whether printer 15 is on-line or off-line.

Figure 2:
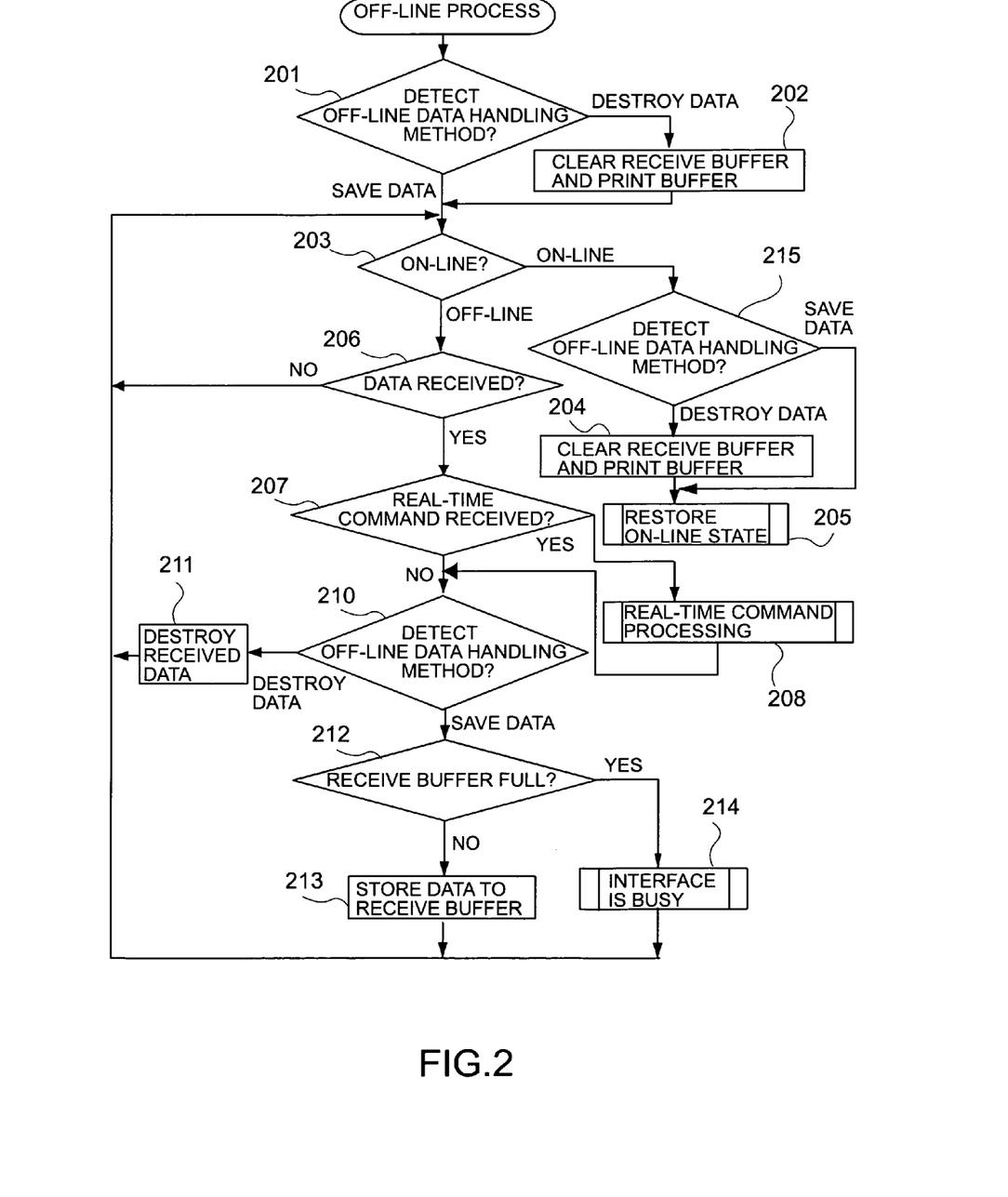
FIG. 2 is a flow chart of the control process when the printer according to a preferred embodiment of our invention is off-line.

FIG. 2 is a flow chart of the control process of our invention when printer 15 is off-line. The control process shown in FIG. 2 is performed when printer 15 goes off-line for a particular reason. Factors which could cause printer 15 to go off-line include, for example, the user opening the printer 15 cover, there being no paper loaded, or a specific error occurring in printer control.

CPU 16 detects when printer 15 goes off-line for some reason, and then starts the control process in FIG. 2. The first step 201 is to read and interpret the printer settings stored previously to RAM 23.

If the destroy data mode is set, all data in receive buffer 17 and print buffer 20 is cleared (step 202). One method for accomplishing this is a clearing unit that reinitialize the pointers used to specify the addresses in receive buffer 17 and print buffer 20. Alternatively, the printing motor may be disabled while data in receive buffer 17 continues to be processed. If the save mode is set, control advances to step 203 without clearing receive buffer 17 and print buffer 20.

Step 203 detects whether printer 15 is off-line.

If printer 15 has gone on-line again after this off-line control process has started because the user has switched printer 15 to the on-line mode, for example, control advances to step 215. Step 215 again detects the off-line mode setting. If set to the data destroy mode, receive buffer 17 and print buffer 20 are cleared (204) and the printer is then set to the on-line mode (205). If set to the data save mode, the printer is set to the on-line mode (205) without clearing receive buffer 17 and print buffer 20.

As further described below, if the destroy mode is set and data is not stored to the buffers while the printer is off-line, or if the destroy mode is set and data stored in the buffers continues to be processed and subsequently removed while the printer is off-line and the printing motor is disabled, it is not always necessary to clear the buffers when the printer is returned on-line. If set to the save mode, however, clearing the buffers prevents errors resulting from data left in the buffer when the printer goes on-line.

It should be noted that printer 15 can receive data from host 10 while off-line.

If step 203 determines that the printer is still off-line, printer 15 awaits data from host 10 (206), and if data is received from host 10 while the printer is off-line, control advances to step 207. The real-time command detector and processor 25 then detects whether a real-time command is contained in the received data. If a real-time command is not present, control advances to step 210.

If a real-time command is present, control advances to step 208 where the command is interpreted and run. Then control advances to step 210.

The off-line mode setting is again detected at step 210 to determine whether the save or destroy mode is set. If set to destroy, the data is destroyed without being saved to receive buffer 17 (211), and the procedure loops back to step 203 to repeat the process for any data received next. Alternatively in the destroy mode, the received data continues to be stored in receive buffer 17 and continues to be processed with the printing mechanism, i.e. printing motor, disabled or shut off. The loop from steps 203 to 210 is repeated for as long as printer 15 remains off-line. As a result, receive buffer 17 is prevented from becoming full while the printer is off-line, and the communication interface will not enter a busy state. Other method of destroying data during the off-line mode are likewise possible. For example, received data may be stored in received buffer 17 and not processed, but the receive buffer may be automatically cleared when the received data has filled a predetermined amount of buffer space (i.e. 80% full) less than the amount that would typically result with a "buffer full" signal (i.e. 95% full).

If step 210 determines that the off-line save mode is set, control advances to step 212. Step 212 detects whether the receive buffer 17 is full. If not full, the received data is stored sequentially to receive buffer 17 (213). If the receive buffer 17 is full in step 212, the host 10 is notified that the interface is busy (214).

Host 10 control relative to printer 15 control is described next. When the off-line printer mode is set to the data destroy mode in the flow chart shown in FIG. 2, all print data sent from the host 10 while the printer 15 is off-line is destroyed, as described above, and will not be printed. Control of the host 10 in this embodiment of the invention addresses this problem by a resending unit for resending print data sent while the printer was off-line after the printer returns on-line. A CPU with a program set stored in the ROM may form the resending unit.

To detect whether all print data sent to printer 15 was printed by printer 15, host 10 uses a control command requesting notification that printing has been completed (referred to below as the printing completed command). This printing completed command is returned by printer 15 when the corresponding print data has been completely printed, and is sent in response to a request for such notification from host 10. In this exemplary embodiment of our invention the print data to which this command applies is the print data sent immediately before this printing completed command.

In a practical implementation of our invention this printing completed command can be achieved using a command having the same characteristics, that is, a command that is returned when printing is completed. For example, the printer control command ESC r1 can be used as this printing completed command. This ESC r1 command is returned to host 10 as a 1-byte status command identifying the status of paper in printer 15. If printer 15 is in the middle of printing, this ESC r1 command is sent to host 10 to confirm the paper status after printing is completed.

Figure 3:
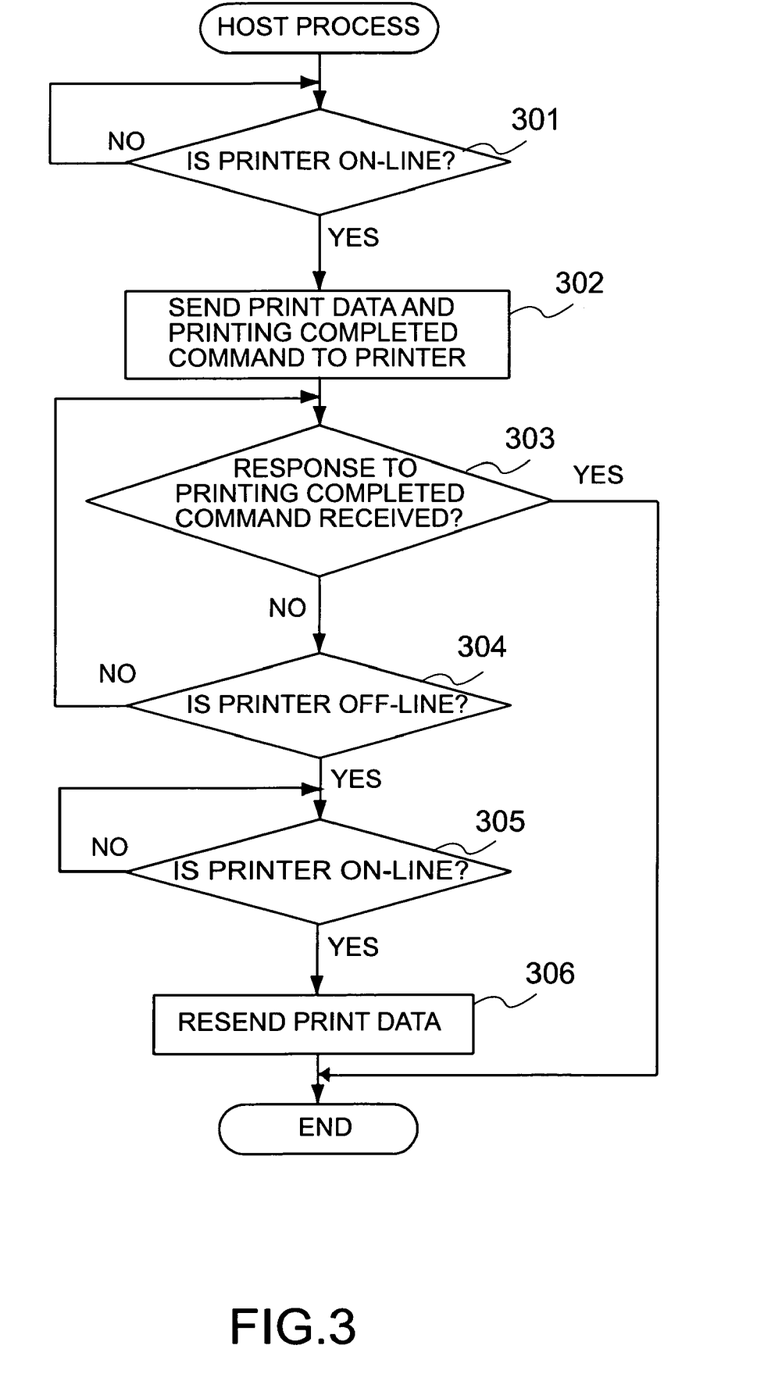
FIG. 3 is a flow chart of the control process of host computer operation when sending print data to the printer.

FIG. 3 is a flow chart of host 10 control when print data is sent to printer 15. The control process of the host 10 is described next below with reference to FIG. 3.

When printer 15 is confirmed to be on-line (301), host 10 sends print data with the printing completed command appended to the end thereof (302). After sending print data to the printer 15 with the printing completed command following the print data, host 10 waits for confirmation from the printer 15 that printing is completed (i.e., waits for a response corresponding to the above-noted printing completed command) (303). Host 10 continues to wait for this response as long as printer 15 does not go off-line (304). When the printer 15 completes printing and sends a response comparable to this printing completed command to host 10 (yes in step 303), host 10 determines that the transmitted print data was successfully printed and ends this process.

If printer 15 goes off-line due to some error or other problem before the printing completed command is returned, printer 15 reports to the host that it has gone off-line (304). When the host 10 receives this off-line report, control moves to step 305 to wait for printer 15 to return on-line. When the printer problem is corrected and the printer 15 returns on-line, host 10 receives an on-line report from the printer (305), and resends previously sent print data and printing completed command (306). Note that this off-line and on-line status report from printer 15 is accomplished by the ASB function of printer 15.

If printer 15 is set to the data destroy mode while off-line in FIG. 2, any data in receive buffer 17 and print buffer 20 is destroyed when the printer 15 goes off-line. By sending print data to printer 15 according the control process shown in FIG. 3, print data sent by host 10 can be reliably printed irrespective of the off-line printer mode setting.

Figure 4:
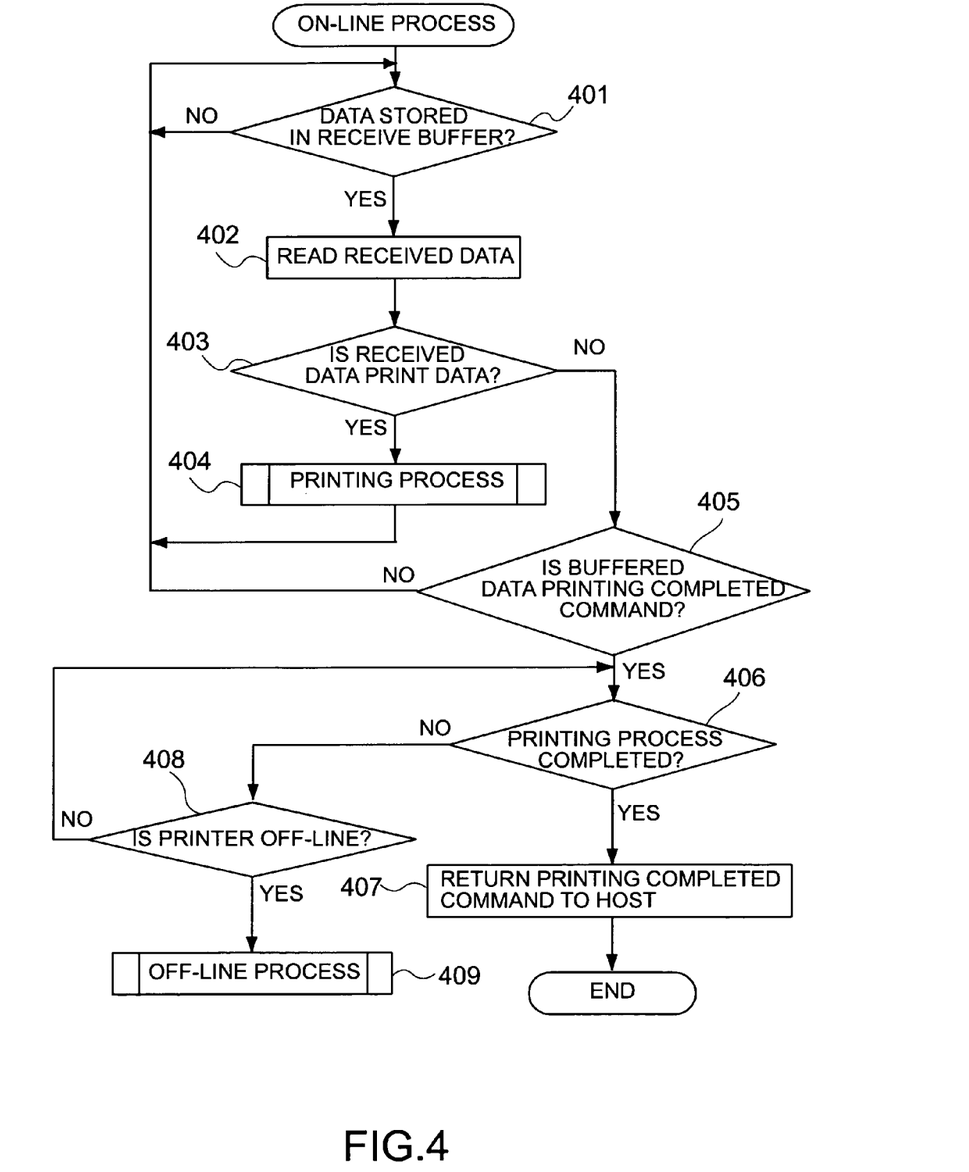
FIG. 4 is a flow chart of printer operation when print data is sent from the host computer in accordance with the control process shown in FIG. 3.

FIG. 4 is a flow chart of the printer 15 control process when the printer 15 is on-line and print data is sent from host 10 according to the process shown in FIG. 3. Printer 15 confirms whether data is stored to receive buffer 17 (401). If there is, the data is read in blocks of a specific size and passed to data interpreter 18 (402). The data interpreter 18 detects whether the read data is print data (403), and if it is CPU 16 runs the printing process (404). Step 404 repeats until all print data has been printed.

When all print data read in step 402 is processed, the printing completed command appended to the print data will be read next, and step 403 will pass control to step 405. When the read data is the printing completed command, step 405 waits for the printing process to be completed (406) and then sends a response corresponding to the printing completed command to host 10 (407). When the host 10 receives this response, it confirms that all sent print data has been successfully printed as described above. If printer 15 goes off-line due to an error or other reason before printing is completed (408), the off-line control process (409) shown in FIG. 2 is run.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

For example, the invention shall not be limited to the data transmission procedure of the host 10 described above, and includes procedures for sending data according to other known methods.

Furthermore, this exemplary embodiment has been described as destroying all data other than real-time commands sent from host 10 when printer 15 is off-line and set to the data destroy mode. However, it is alternatively possible to clear receive buffer 17 and print buffer 20 when the printer goes off-line and then store data received while the printer is off-line. In this case the mode setting is a 2-bit command, one bit used to set the data handling procedure when the printer enters the off-line mode, and one bit used to set the data handling procedure while the printer remains off-line. An optional third bit can indicate whether stored data should continue to be processed while the printing motor is disabled or shut off.

Furthermore, because a busy signal is sent to host 10 when receive buffer 17 becomes full, it is also possible to clear only receive buffer 17 and not clear print buffer 20 when off-line.

As will be known from the above description, our invention prevents the printer receive buffer from becoming full and the communication interface with the host computer from entering a busy state even when a large volume of data is received while the printer is off-line. The host computer can therefore continue to send control commands to the printer, and can therefore determine the printer status or recover the printer from a recoverable error state. In addition, because data is destroyed by the printer and thus prevents the communication interface from returning a busy signal due to a full receive buffer, the print spooler is prevented from generating an error in systems in which the host computer sends print data to the printer via a print spooler.

It is also possible to selectively set a printer according to our invention to save or destroy received data when the printer is off-line, and the printer can thus be set to the mode appropriate to the current operating conditions.

Furthermore, real-time commands can still be executed when the printer is off-line, thereby enabling printer status to be determined and recoverable printer errors to be corrected using such real-time commands.

Yet further, the host computer can resend print data when data in the receive buffer has been cleared by the control method of our invention, and print data can therefore be reliably printed.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Still further, while the present invention has been described as controlling a printer depending on whether it is in the on-line state or the off-line state, the same principle may be applied to other states. The "off-line state" has been defined as a state in which the printer does not interpret received data in the receive buffer. For printers that do not print, but do interpret data when the printer is off-line the above definition of the term "off-line" would not be correct. For such types of printer, for instance, the "off-line state" in the preceding description may be replaced by "first state" defined as a state in which the printer does not print received data, while the "on-line state" may be replaced by "second state" defined as a state in which the printer prints received data.

KEY TO THE FIGURES

10 host computer
11 application program
12 printer driver
13 print spooler
14 interface cable
15 printer
16 CPU
17 receive buffer
18 data interpreter
19 printer controller
20 print buffer 21 print head
22 paper feed mechanism
23 RAM
24 ROM
25 real-time command detector and processor
26 status processor

What is claimed is:

1. A printer adapted to be connected to a host computer and to receive data including control commands from the host computer, comprising:
 a receive buffer for temporarily storing received data;
 a data interpreter for interpreting the data in said receive buffer;
 control means responsive to said data interpreter for controlling the printer;
 state detection means for detecting whether the printer is in a first state in which data is received and the received data is not printed, or in a second state in which data is received and the received data is printed;
 clearing means for clearing the receive buffer,
 characterized in that said clearing means is effective for automatically clearing said receive buffer immediately after said state detection means detecting said first state without need of a real-time buffer clearing command from said computer; and
 a data discarding means for discarding print data and not discarding command data received from said host computer while said printer is in said first state.

2. The printer of claim 1, further comprising:
 setting means for setting a data handling mode that determines how data are handled when said printer is in said first state; and
 reading means for reading said data handling mode in response to said printer entering said first state, as determined by said state detection means;
 wherein said clearing means is adapted to clear said receive buffer only when said data handling mode is set to allow clearing of said receive buffer.

3. The printer of claim 2, wherein said setting means is adapted to set said data handling mode in response to a specific control command from said host computer.

4. The printer of claim 1, wherein said data discarding means is adapted to discard data only when said data handling mode is set to allow discarding the data received from said host computer.

5. The printer of claim 1, further comprising a print buffer for storing expanded print data, wherein said clearing means is adapted to clear both said receive buffer and said print buffer.

6. The printer of claim 1 wherein said first state is an off-line state in which said data interpreter does not interpret received print data and does interpret received command data, and said second state is an on-line state in which said data interpreter interprets all received data.

7. A method of controlling a printer, comprising the steps of:
 (a) detecting whether said printer is in a first state in which data is received and the received data is not printed or in a second state in which data is received and the received data is printed;
 (b) automatically clearing a receive buffer for temporarily storing received data immediately after said printer entering said first state without need of a real-time buffer clearing command from said computer; and
 (e) discarding print data and not discarding command data received from a host computer after said receive buffer was cleared in step (b) and until step (a) detects said second state.

8. The method of claim 7, wherein step (b) is accomplished immediately after said first state is detected in step (a).

9. The method of claim 8, further comprising the steps of:
 (c) setting a data handling mode so as to either allow or not allow clearing of said receive buffer; and
 (d) reading said data handling mode in response to detection of said first state in step (a);
 wherein step (b) comprises clearing said receive buffer only when said data handling mode read in step (d) allows clearing of said receive buffer.

10. The method of claim 9, wherein step (c) is accomplished according to a specific control command from a host computer.

11. The method of claim 9, wherein step (e) comprises discarding data only when said data handling mode read in step (d) further allows discarding the data received from a host computer.

12. The method of claim 7, further comprising a step of:
 (f) saving in said receive buffer data received from a host computer after said receive buffer was cleared in step (b) and until step (a) detects the second state.

13. The method of claim 7, further comprising a step of:
 (g) clearing said receive buffer when said second state is detected in step (a) after said first state had been detected previously.

14. The method of claim 13, wherein step (g) comprises clearing said receive buffer and a print buffer.

15. The method of claim 7, wherein step (b) comprises clearing said receive buffer and a print buffer.

16. The method of claim 7, wherein said first state is an off-line state and said second state is an on-line state.

17. A printer adapted to be connected to a host computer and to receive data including control commands from the host computer, comprising:
 a receive buffer that temporarily stores received data;
 a data interpreter that interprets the data in said receive buffer;
 a controller responsive to said data interpreter that controls said printer;
 a state detector that detects whether said printer is in a first state in which data is received and the received data is not printed, or a second state in which data is received and the received data is printed;
 a clearing unit that clears said receive buffer,
 wherein said clearing unit is effective for automatically clearing said received buffer immediately after said state detector detecting said first state without need of a real-time buffer clearing command from said computer; and
 a data discarding unit that discards print data and does not discard command data received from said host computer while said printer is in said first state.

18. The printer of claim 17, further comprising:
 a setting unit that sets a data handling mode that determines how data are handled when said printer is in said first state; and
 a reading unit that reads said data handling mode in response to said printer entering said first state as determined by said state detector;
 wherein said clearing unit is adapted to clear said receive buffer only when said data handling mode is set to allow clearing of said receive buffer.

* * * * *